Patented Mar. 20, 1934

1,951,708

UNITED STATES PATENT OFFICE

1,951,708
OZONATION PRODUCTS OF TERPENE ALCOHOL

Lanning Parke Rankin, Dover, N. J., assignor to Hercules Powder Company, Wilmington, Del., a corporation of Delaware No Drawing. Application February 24, 1928
Serial No. 256,802

15 Claims. (Cl. 260—16)

My invention relates to ozonation products of terpene alcohol and method of producing the same. The composition according to my invention is adaptable for use, for example, as an oxidizing agent, a solvent or colloiding agent for nitrocellulose, thus making it available as an ingredient of lacquers and to a degree as a drying oil.

The composition in accordance with my invention comprises essentially a terpene alcohol, $C_{10}H_{17}OH$ having one double bond, as for example, a terpineol, as alpha-terpineol, beta-terpineol and the like, terpinenol, or mixtures thereof, which have been ozonized or which have been ozonized and then partially decomposed by the application of heat after ozonization.

In the production of the composition in accordance with my invention, for example, commercial liquid technical terpineol comprising a mixture of isomeric terpineols, pure crystalline alpha-terpineol, melting point 33° C.–35° C., and which when melted will remain liquid throughout ozonization, or a pine oil cut, for example, a cut boiling largely within about the range 215° C.–220° C. and containing about 75% alpha-terpineol, may be ozonized, for example, by passing through it oxygen or air or other gas containing ozone, or by adding to it a liquid as, for example, carbon tetrachloride containing ozone. The character of the ozonized product will be affected to some extent by the method of ozonization and by the temperature of ozonization which may be effected at a temperature within about the range 0° C.–80° C., though the temperature is desirably maintained within the more limited range 20° C.–50° C.

When the desired ozonization is effected, the ozonized product is heat-treated, by the direct application of heat or by steam distillation. On heating the ozonized product to say, a temperature within about the range 75° C.–130° C. or in the case of alpha-terpineol to a temperature of say about 100–125° C. the product will decompose with formation of a product containing aldehydes, acid and ketones; the presence of the latter makes it an excellent solvent for nitrocellulose. In effecting heat treatment of the ozonized product, it may be partially steam distilled.

As a more specific example of the production of the composition in accordance with my invention from, for example, alpha-terpineol, say about two liters of crystalline alpha-terpineol, suitably melted, are ozonized with oxygen containing about 20 milligrams of ozone per liter for a period of twenty-four hours at a temperature of about 30° C. The ozonized oxygen is preferably passed into the alpha-terpineol at the rate of about two liters per minute. The ozonized product obtained will not be completely ozonized, but will be substantially more viscous than the original alpha-terpineol and will have an acid number of about 10 and a saponification number of about 70 as compared with 0 for the corresponding values of the original alpha-terpineol. The ozonized product will have an iodin liberating value, such that one gram of the ozonized product will liberate slowly more than 0.25 grams of iodin from a solution of potassium iodide. If desired, the period of ozonization may be prolonged beyond twenty-four hours with more complete ozonization and yield of a product having increased viscosity and a higher iodin liberating value against potassium iodide solutions.

On ozonization of the terpineol, the molecule of ozone enters the terpineol molecule at the double bond in chains of three oxygen atoms, and some oxidation and polymerization of the terpineol molecule occurs. Ozonization converts the terpineol into a strong oxidizing agent, the acid number varying from 1 to 40 and the saponification number may reach 150 or higher. The ozonized product in addition to its power as an oxidizing agent, may be of use as a drying oil and will have a colloiding effect on nitrocellulose.

When the ozonization of the terpineol, as for example, technical terpineol, is effected, the ozonized product is desirably heat-treated, as has been indicated, by the direct application of heat or by distillation with steam. The decomposition of the ozonized terpineol results in the formation of a product containing aldehydes, acids and ketones, the presence of the latter increases its solvent power on nitrocellulose. In effecting heat treatment of the ozonized product, it may be steam distilled and the decomposed product resultant from distillation or the application of heat may be given an alkali wash for the separation of acidic compounds when such are undesirable.

As an example of the production of the composition resulting from heat treatment of the ozonized product in accordance with my invention, 100 g. of the liquid terpineol of commerce may be ozonized at a temperature of about 25° C. for 8 hours with ozonized oxygen containing about 20 milligrams of ozone per litre. The ozonized product is then subjected to steam distillation and about 20% distilled off as unaltered terpineol leaving a residual product which will readily colloid nitrocellulose. Where it is desired to remove acidic compounds from the product such may be accomplished by extracting the product with, for example, a 5% solution of sodium hydroxide. The extract will on acidification yield oils boiling chiefly above 100° C. under 5 m. m. Hg. pressure and a residue will be obtained consisting largely of phenols, acids, ketonic bodies and polymerized products.

The ozonized product after the heat treatment to effect partial decomposition, may be given a second heat treatment, preferably at a temperature within about the range 90° C.–130° C. in the presence of a dehydrating agent, such as a dilute acid, iodin or fuller's earth, for the purpose of converting the terpineol into hydrocarbons. This treatment gives a product having a lower boiling range, which may render it more desirable for use in lacquers. The hydrocarbons produced by dehydration may be separated by distillation leaving a high boiling product which colloids nitrocotton and which may be employed as a plasticizer in lacquers. As an example of the treatment for dehydration of the ozonized product, say 500 cc. of alpha-terpineol may be ozonized for 10 hours at about 25° C. by passing through it 2 litres of oxygen per minute, containing 20 mg. of ozone per litre. After partial decomposition by heating to about 125° C., it may be heated with 1 g. of iodin for a period of about 3 hours and at a temperature of about 120° C. Approximately 75% of the product will be converted into dipentene and other terpenes. On distilling off the terpenes, a residue will remain boiling largely about 200° C. at 25 mm. This residue will desirably colloid nitrocotton.

The heat-treated ozonized product, as has been indicated, lends itself to use as a solvent or colloiding agent for nitrocellulose and may desirably be used as an ingredient of lacquers containing nitrocellulose as an ingredient. When used as an ingredient of lacquer, the heat-treated product may replace in part other nitrocellulose solvents and may be used in varying proportions. The following formula will be illustrative of lacquer including ozonized heat-treated terpineol:

| | Per cent |
|---|---|
| Low viscosity nitrocotton | 10 |
| Denatured alcohol | 5 |
| Benzene | 25 |
| Butanol | 10 |
| Ethyl acetate | 6 |
| Butyl acetate | 16 |
| Gum solution | 16 |
| Diethyl phthalate | 5 |
| Ozonized and heat-treated terpineol | 7 |

A lacquer including ozonized, heat-treated and dehydrated terpineol may be made in accordance with the following formula:

| | Per cent |
|---|---|
| Low viscosity nitrocotton | 10 |
| Denatured alcohol | 5 |
| Benzene | 25 |
| Butanol | 7 |
| Ethyl acetate | 6 |
| Butyl acetate | 16 |
| Gum solution | 16 |
| Diethyl phthalate | 5 |
| Ozonized, heat-treated and dehydrated terpineol | 10 |

Having now fully described my invention, what I claim and desire to protect by Letters Patent is:—

1. The ozonization products of a terpene alcohol having one double bond which have been heat treated at an elevated temperature not in excess of 130° C.

2. The ozonization products of a terpineol which have been heat treated at an elevated temperature not in excess of 130° C.

3. The ozonization products of alpha-terpineol which have been heat treated at an elevated temperature not in excess of 130° C.

4. The method of producing a composition of matter which includes subjecting a terpene alcohol having one double bond to ozonization and then to heat treatment at an elevated temperature not in excess of 130° C.

5. The method of producing a composition of matter which includes subjecting a terpineol to ozonization and subjecting the ozonized product to heat treatment at a temperature of within about the range 75° C.–130° C.

6. The method of producing a composition of matter which includes subjecting alpha-terpineol to ozonization and then to treatment with heat at an elevated temperature not in excess of 130° C.

7. The method of producing a composition of matter which includes subjecting a pine oil cut, boiling largely within the range 215–220° C. and composed largely of alpha-terpineol, to ozonization and then to treatment with heat at an elevated temperature not in excess of 130° C.

8. The ozonization products of a pine oil cut boiling largely at a temperature within the range 215–220°C. which have been heat treated at a temperature within the range 75–130° C.

9. The method of producing a composition of matter which includes subjecting a terpene alcohol having one double bond to ozonization and then to distillation with steam.

10. The method of producing a composition of matter which includes subjecting alpha-terpineol to ozonization and then to distillation with steam.

11. The method of producing a composition of matter which includes subjecting terpineol to ozonization and then to heat treatment at a temperature not in excess of about 130° C.

12. The method of producing a composition of matter which includes subjecting a pine oil cut boiling largely within the range 215–220° C. to ozonization and then to distillation with steam.

13. The ozonization products of a terpene alcohol having one double bond, which have been distilled with steam.

14. The ozonization products of a terpineol which have been distilled with steam.

15. The ozonization products of terpineol which have been heat treated at an elevated temperature not in excess of about 130° C.

LANNING PARKE RANKIN.